United States Patent
Hausler et al.

(10) Patent No.: US 7,344,186 B1
(45) Date of Patent: Mar. 18, 2008

(54) A-PILLAR STRUCTURE FOR AN AUTOMOTIVE VEHICLE

(75) Inventors: Henry Hausler, Manchester, MI (US); John Reed, Hudson, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/650,751

(22) Filed: Jan. 8, 2007

(51) Int. Cl.
    *B62D 25/00* (2006.01)
(52) U.S. Cl. ............................. 296/187.05; 296/193.06
(58) Field of Classification Search ............ 296/187.05, 296/193.06, 203.02, 203.03, 205, 187.03, 296/187.09, 187.1
    See application file for complete search history.

(56) References Cited

U.S. PATENT DOCUMENTS 7,168,756 B2 * 1/2007 Hasegawa et al. ..... 296/203.03

* cited by examiner

*Primary Examiner*—Joseph D Pape
(74) *Attorney, Agent, or Firm*—Fredrick Owens; Miller Law Group, PLLC

(57) ABSTRACT

An A-pillar structure on an automotive vehicle is manufactured from a formed tubular member that replaces the conventional inner and inner reinforcement members. The door opening panel is formed with conventional flanges that are welded or adhered to the tubular member to provide a conventional uniform surface against which the windshield and front door seals can be supported. The door opening panel flanges can be welded by one-sided welding techniques, such as laser stitch welding, to the tubular member. As an option, the movement of the front door seal from the ab flange to the front door can provide an opportunity to form the tubular member with a still larger cross-section for enhanced strength. The distance dimension spanning the opposing flanges to define the standard arc for maintaining binocular vision is retained while increasing the strength of the A-pillar due to the enlarged cross-sectional configuration provided by the tubular member.

17 Claims, 2 Drawing Sheets

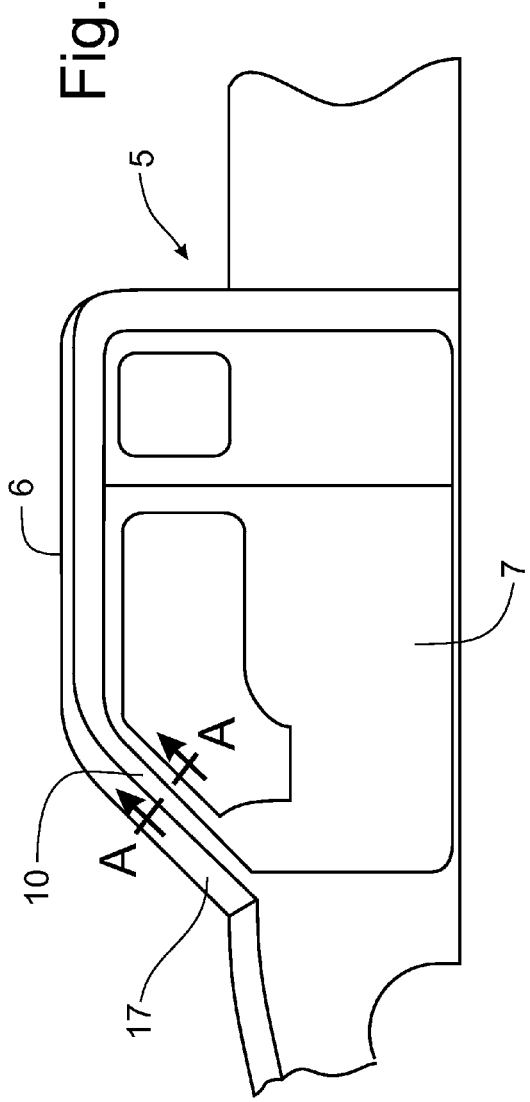
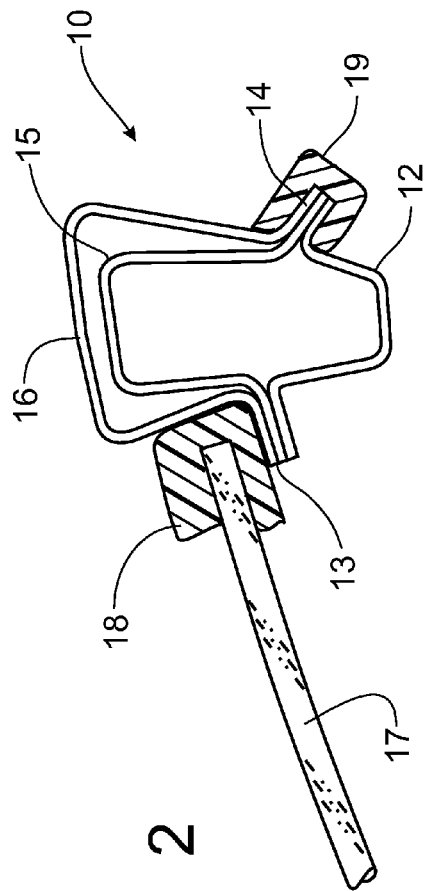

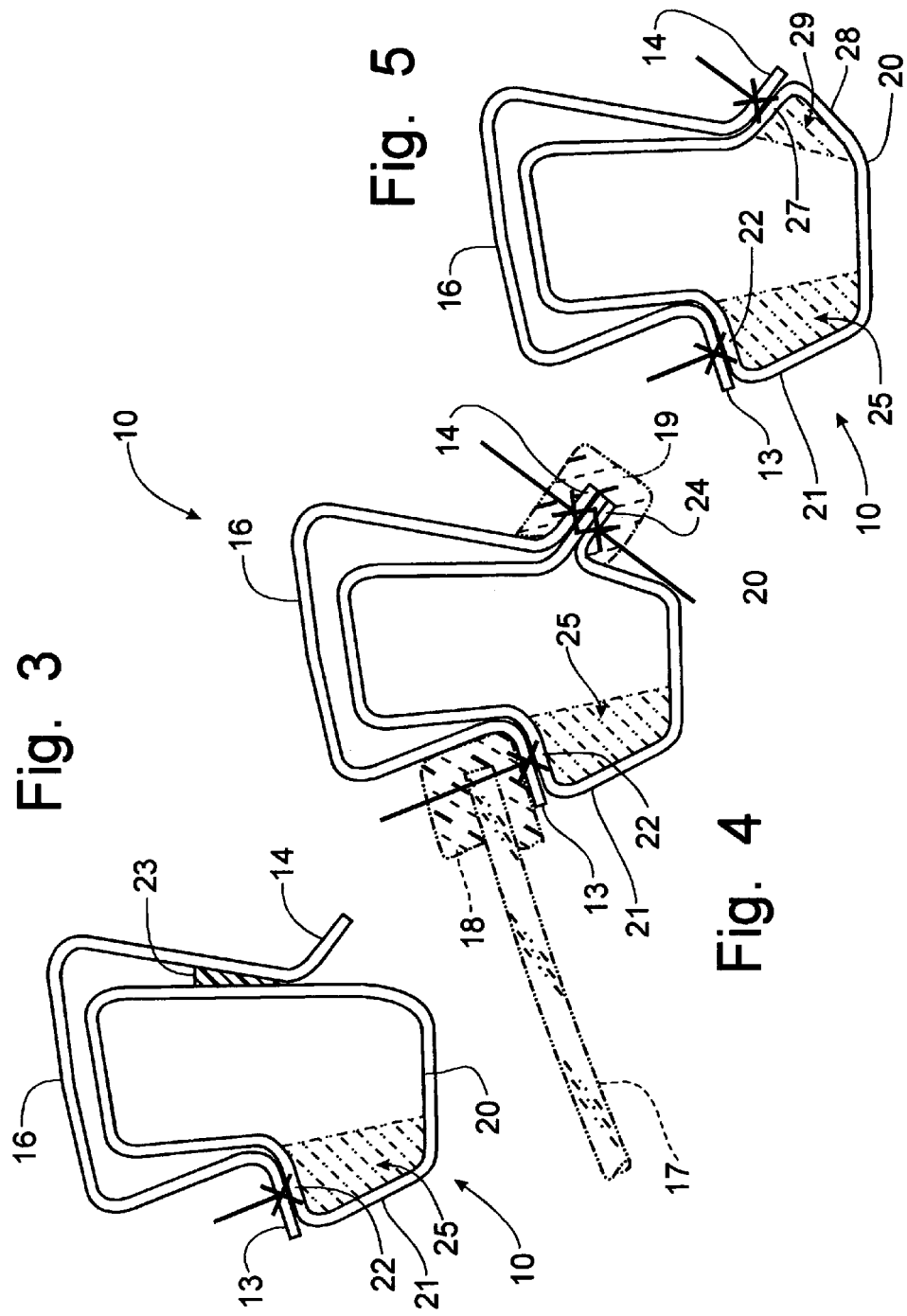

A-PILLAR STRUCTURE FOR AN AUTOMOTIVE VEHICLE

FIELD OF THE INVENTION

This invention relates generally to an A-pillar on an automotive vehicle and, more particularly, to a structural configuration that will maximize the cross-sectional configuration while maintaining binocular vision for the operator of the vehicle.

BACKGROUND OF THE INVENTION

The A-pillars on an automotive vehicle are the structural members of an automotive frame positioned between the windshield and the front doors. The A-pillars support the roof structure as well and, therefore, must provide substantial support in rollover events. At the same time, the A-pillar lies within the sight lines of the operator and needs to have a minimal profile to allow the operator to maintain binocular vision with respect to the A-pillar. Thus, the designers of automobiles are faced with conflicting requirements with respect to the design of the A-pillars. To provide a strong structural member, the A-pillar needs to have a maximum cross-sectional configuration, yet maintain a minimal cross-section for vision purposes.

To achieve maximum cross-section of a tubular inner member for an A-pillar body structure, while maintaining acceptable binocular vision standards, a traditional flange formation and welding is restrictive. The flanges provide for a sealing relationship with respect to both the windshield and the front door that are supported on the A-pillars. Typically, the elastomeric seals for both the windshield and the adjacent portion of the front doors are mounted on the flanges of the A-pillars. The door opening panel is typically welded on the outside of the A-pillar structure to provide a uniform surface against which the front door can close.

The conventional A-pillar structure is reflected in FIG. 2, which is a cross-sectional view of the A-pillar corresponding to lines A-A of FIG. 1. The A-pillar 10 is formed of a shaped inner member 12 that is formed with opposing vertically extending flanges. A reinforcement member 15 having mating flanges is welded at the flanges to the outer side of the inner member 12 to form a generally vertically extending beam 10. The door opening panel 16 is also formed with mating flanges that are welded to the flanges of the reinforcement member 15. The door opening panel 16 provides a uniform surface for support of the windshield 17 supported in an elastomeric seal 18 against the welded flange 13, while the front door (not shown) closes against a seal (not shown) typically mounted on the opposing welded flange 14. The distance from the lateral ends of the opposing welded flanges 13, 14 defines the arc of seven and a half degrees, or less, relative to the position of the operator of the vehicle.

It would be desirable to provide an A-pillar configuration that has an increased cross-section and greater tube size to provide a greater measure of strength for the A-pillar, while maintaining dimensional standards for binocular vision by the operator of the vehicle.

SUMMARY OF THE INVENTION

It is an object of this invention to overcome the aforementioned disadvantages of the known prior art by providing an A-pillar configuration that utilizes greater tube size and defines a larger cross-section than conventional A-pillars on automotive vehicles.

It is another object of this invention to maintain the dimensional standards in the A-pillar for providing binocular vision by the operator of the automobile.

It is a feature of this invention that the conventional inner member and the conventional reinforcement member of an A-pillar are replaced by a tubular member shaped to support the flanges of the door operating panel.

It is another feature of this invention that laser stitch welding techniques, one-sided welding techniques and adhesive technologies can be utilized to secure the door operating panel to the tubular A-pillar member.

It is an advantage of this invention that the strength of the A-pillar is substantially increased over conventional A-pillar design.

It is another advantage of this invention that the dimensions for maintaining binocular vision for the vehicle operator are not exceeded.

It is still another object of this invention to provide an A-pillar having maximum cross-section with little or no effect on vision requirements.

It is still another feature of this invention that the tubular member can be manufactured utilizing hydroforming techniques.

It is still another advantage of this invention that the manufacturing techniques other than hydroforming can be used to form the tubular member, including roll-forming techniques.

It is yet another feature of this invention that the tubular member is designed to fit behind the outer surface of the door opening panel.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is schematic perspective view of an automotive vehicle having an A-pillar supporting the windshield and front door assembly, and incorporating the principles of the instant invention;

FIG. 2 is a cross-sectional view of the conventional A-pillar structure, corresponding to lines A-A of FIG. 1, the description of this prior art A-pillar structural configuration being found in the Background of the Invention above;

FIG. 3 is a cross-sectional view of a first embodiment of the A-pillar incorporating the principles of the instant invention, the cross-sectional view corresponding to lines A-A of FIG. 1;

FIG. 4 is a cross-sectional view of a second embodiment of the A-pillar incorporating the principles of the instant invention, the cross-sectional view corresponding to lines A-A of FIG. 1; and FIG. 5 is cross-sectional view of a third embodiment of the A-pillar incorporating the principles of the instant invention, the cross-sectional view corresponding to lines A-A of FIG. 1.

DETAILED DESCRIPTION OF THE PREFERRED EMBODIMENT

Referring to FIGS. 1-5, an A-pillar structure for an automotive vehicle incorporating the principles of the instant invention can best be seen. The automotive vehicle 5 is formed with an A-pillar 10 that supports the roof 6, the front door 7 and the windshield 17. FIG. 2 is a depiction of the conventional prior art A-pillar structure over which the instant invention represents an improvement. The conventional A-pillar structure is reflected in FIG. 2, which is a cross-sectional view of the A-pillar corresponding to lines A-A of FIG. 1. The A-pillar 10 is formed of a shaped inner member 12 that is formed with opposing vertically extending flanges. A reinforcement member 15 having mating flanges is welded at the flanges to the outer side of the inner member 12 to form a generally vertically extending beam 10. The door opening panel 16 is also formed with mating flanges that are welded to the flanges of the reinforcement member 15. The door opening panel 16 provides a uniform surface for support of the windshield 17 supported in an elastomeric seal 18 against the welded flange 13, while the front door (not shown) closes against a seal 19 typically mounted on the opposing welded flange 14. The distance from the lateral ends of the opposing welded flanges 13, 14 defines the arc of seven and a half degrees, or less, relative to the position of the operator of the vehicle.

The first embodiment of the instant invention is shown in FIG. 3. The inner member and the inner reinforcement member are replaced by a tubular member 20 that is formed to include a first landing 22 against which the flange 13 of the door opening panel 16 is supported. The flange 13 is preferably welded to the landing 22 by one-sided welding techniques, including laser stitch welding. The incorporation of the landing 22 enables the tubular member 20 to have an increased size with the added cross-sectional area 25 increasing the size of the A-pillar structure 10. The opposing flange 14 of the door opening panel 16 can be adhered with modern adhesive technology, representatively identified at 23, to provide the necessary support for the door seal (not shown). Since the door opening panel 16 remains the same shape as in the conventional prior art door opening panel 16, the windshield 17 and the front door 7 have the same uniform surface against which to seal. One of ordinary skill in the art will recognize that the tubular member 20 can be formed efficiently with a hydroforming manufacturing process.

The limit of the landing 22 of the tubular member 20 is defined by a lateral surface 21 which is angled according to the sight lines of the operator of the vehicle 5. Accordingly, the tubular member 20 lies within the seven and a half degree arc that will maintain binocular vision for the operator of the vehicle 5. The orientation of the windshield side lateral surface 21 of the tubular member 20 is consistent from this first embodiment to the other embodiments of the instant invention described below. One skilled in the art will recognize that, because the operator is physically closer to the driver's side A-pillar than the passenger side A-pillar, the structural configuration of the driver's side A-pillar is more restrictive with respect to maintaining binocular vision for the operator than the structural configuration of the passenger side A-pillar.

The second embodiment of the instant invention can be seen in FIG. 4. The tubular member 20 continues to be formed with the landing 22 in support of the flange 13 on the door opening panel 16. The tubular member 20, however, is also formed with a support flange 24 that would underlie the flange 14 of the door opening panel 16, thus providing essentially the same support structure found in the conventional prior art A-pillar configuration depicted in FIG. 2. The tubular member 20, in the second embodiment shown in FIG. 4, can be formed through roll-forming techniques, such as is disclosed in U.S. patent application Ser. No. 11/508, 061, filed on Aug. 22, 2006 by John Reed, et al and entitled "Roll-Formed Structural Member with Internal Web", assigned to Ford Global Technologies, LLC, or by a hydroforming process, such as is disclosed in U.S. patent application Ser. No. 11/416,299, filed on May 1, 2006 by James Lowe and entitled "Process for Forming a Hydroformed Automotive Component with Integrated Weld Flange", assigned to Ford Global Technologies, LLC, the contents of both references patent applications being incorporated herein by reference.

As with the first embodiment depicted in FIG. 3, the flange 13 of the door opening panel 16 can be welded to the landing 22 by one-sided welding techniques, including laser stitch welding. The flange 14 of the door opening panel 16 and the support flange 24 of the tubular member 20 can be welded by conventional two-sided welding techniques. As with the first embodiment, the formation of the landing 22 enables the tubular member 20 to provide an increased cross-sectional area, represented by the gained cross-section 25, as compared to the conventional prior art A-pillar structure.

The fourth embodiment of the instant invention is shown in FIG. 5. The tubular member 20 is formed with two landings 22 and 27. The first landing 22 supports the flange 13 of the door opening panel 16, as described above. The second landing 27 supports the opposing flange 14 of the door opening panel 16 to provide a uniform surface against which the front door 7 can seal. Since, however, the flange 14, as shown in FIG. 3, or the welded combination of flanges 14, 24, as depicted in FIG. 4, do not project outwardly from the body of the tubular member 20, the flange 14 cannot support the door seal. Therefore, the door seal would have to be moved to the front door 7. The flange 14 in this third embodiment, however, does provide a convenient location for welding the door opening panel 16 to the tubular member 20 by one-sided welding techniques, such as laser stitch welding. By forming the tubular member 20 with the additional landing 27, the tubular member 20 has a further increase in cross-sectional area by the area of gain 29. Furthermore, neither the flange 13 nor the flange 14 project outwardly beyond the corresponding landing 22, 27 into the sight lines of the operator of the automotive vehicle 5.

As noted above, the windshield side lateral surface 21 of the tubular member 20 is oriented along the sight lines of the operator of the vehicle 5 so as to be within a seven and one-half degree arc for maintaining binocular vision for the operator. The opposing door side lateral surface 28 is oriented to provide an aesthetically desired surface for the A-pillar 10, and retain binocular vision for the operator. One of ordinary skill in the art will recognize that the door side lateral surface 28 could also be oriented along the sight lines of the operator and still retain binocular vision for the operator, while providing slightly more cross-sectional area gain for the tubular member 20.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A structural member for use as an A-pillar in an automotive vehicle to support a windshield seal and a front door seal, comprising:

a shaped tubular member having a first landing surface corresponding to said windshield seal and a second landing surface spaced from said first landing surface; and a door opening panel having a windshield support flange mounted on said first landing surface and a door seal support flange affixed to an opposing side of said tubular member from said first landing surface, neither said door seal support flange nor said windshield support flange project beyond the corresponding said first and second landing surfaces relative to operator sight lines.

2. The structural member of claim 1 wherein said door seal support flange is affixed to an opposing side of said tubular member from said first landing surface by adhesives.

3. The structural member of claim 2 wherein said tubular member is formed with a windshield side lateral surface defining a lateral limit of said first landing surface, said windshield side lateral surface being oriented along sight lines of an operator of said automotive vehicle.

4. The structural member of claim 1 wherein said tubular member is formed with a door side flange member, said door seal support flange of said door opening panel being affixed to said door side flange member.

5. The structural member of claim 1 wherein said door seal support flange of said door opening panel is affixed to said second landing surface.

6. The structural member of claim 5 wherein said windshield support flange and said door seal support flange being affixed to said first and second landing surfaces, respectively, by one-sided welding techniques.

7. In an automotive vehicle having a roof; a windshield including a windshield seal on a perimeter thereof; a front door including a door seal against which said front door seals when closed; and an A-pillar structural member supporting said windshield seal and said door seal, said A-pillar supporting said roof and including a door opening panel having a windshield support flange on which said windshield seal is supported and a door seal support flange on which said door seal is mounted, the improvement comprising:

said A-pillar being formed with a shaped tubular member having a first landing surface on which said windshield support flange is affixed, said tubular member being formed with a windshield side lateral surface defining a lateral limit of said first landing surface, said windshield side lateral surface being oriented along sight lines of an operator of said automotive vehicle, said tubular member also being formed with a door side flange member, said door seal support flange of said door opening panel being affixed to said door side flange member, said door seal being mounted on door side flange member and said door seal support flange.

8. The automotive vehicle of claim 7 wherein said tubular member is formed through a hydroforming process.

9. The automotive vehicle of claim 7 wherein said windshield support flange is welded to said first landing surface through one-sided welding techniques.

10. The automotive vehicle of claim 7 wherein said door seal support flange is affixed to an opposing side of said tubular member from said first landing surface by adhesives.

11. The automotive vehicle of claim 7 wherein said tubular member is formed with a second landing surface, said door seal support flange of said door opening panel being affixed to said second landing surface.

12. The structural member of claim 11 wherein said door seal support flange is affixed to said second landing surface by one-sided welding techniques.

13. The structural member of claim 12 wherein said door seal is supported on said front door.

14. An automotive A-pillar member supporting a windshield seal and engagable with a front door, comprising:

a door opening panel having a windshield support flange for engagement with said windshield seal, and an opposing door seal support flange positioned for engagement with said front door; and a shaped tubular member having a first landing surface on which said windshield support flange is affixed, and a windshield side lateral surface defining a limit of said first landing surface, said windshield side lateral surface being oriented to align with operator sight lines, said tubular member being formed with a door side flange member, said door seal support flange of said door opening panel being affixed to said door side flange member.

15. The A-pillar member of claim 14 wherein said door seal support flange is affixed to an opposing side of said tubular member from said first landing surface by adhesives.

16. The A-pillar member of claim 14 wherein said tubular member is formed with a second landing surface, said door seal support flange of said door opening panel being affixed to said second landing surface.

17. The A-pillar member of claim 16 wherein neither of said door seal support flange nor said windshield support flange project beyond the corresponding said first and second landing surfaces relative to operator sight lines.

* * * * *